Sept. 4, 1934.   F. H. KELLEY   1,972,740
SAW FRAME
Filed May 14, 1934
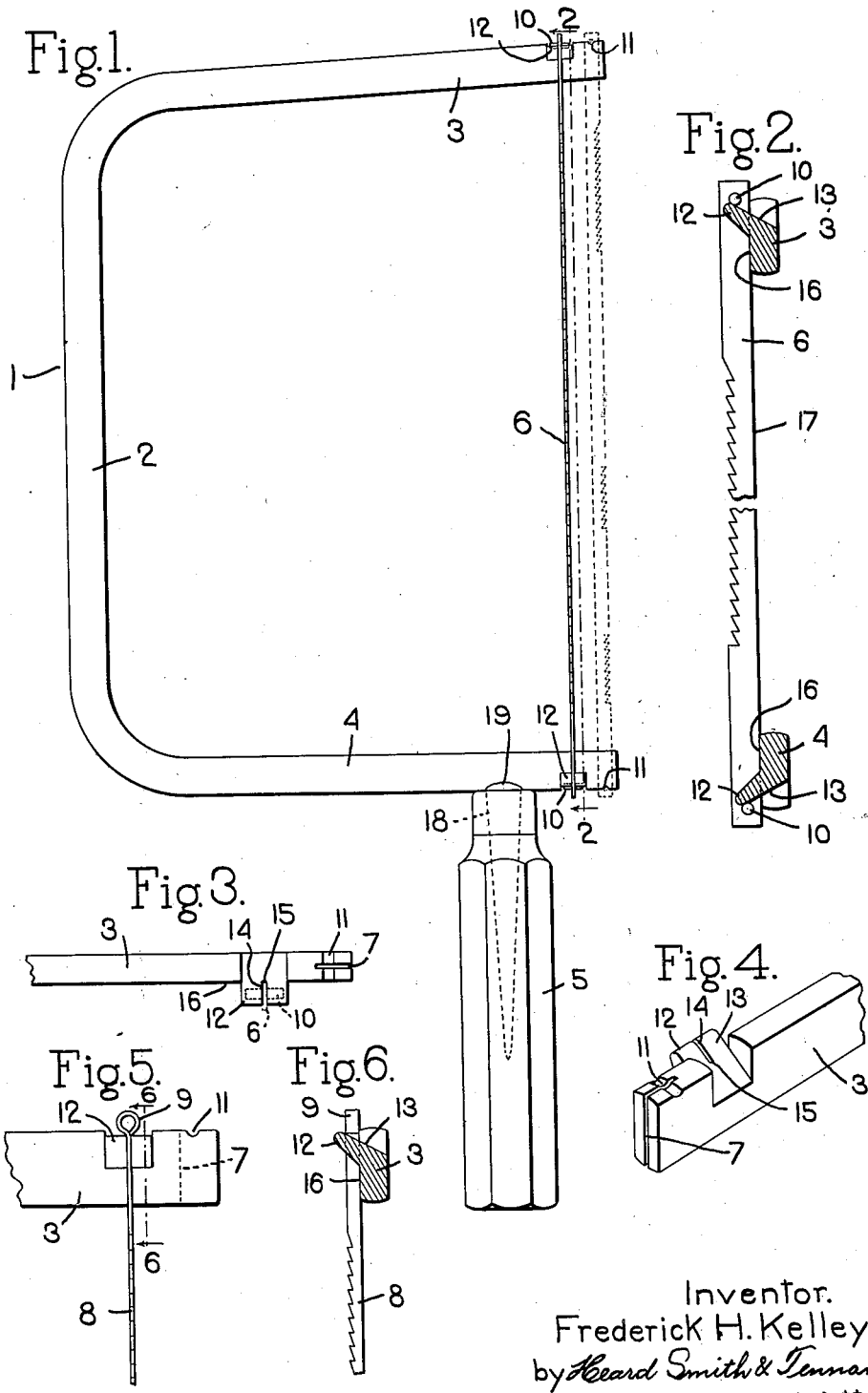
Inventor.
Frederick H. Kelley
by Heard Smith & Tennant.
Attys.

Patented Sept. 4, 1934

1,972,740

UNITED STATES PATENT OFFICE 1,972,740

SAW FRAME

Frederick H. Kelley, Franklin, N. H., assignor to G. W. Griffith Co., Franklin, N. H., a corporation of New Hampshire Application May 14, 1934, Serial No. 725,457

2 Claims. (Cl. 145—33)

This invention relates to so-called "coping saw frames", and especially to such saw frames as are made of flat stock.

The general object of the invention is to provide a saw frame of this type which is light in weight, which is stiff and economical to manufacture, and which is constructed so that it can be used either with saw blades made of fine gauge wire with loop ends or with wider saw blades having anchoring pins at their ends.

Another object of the invention is to provide an improved saw frame of this type which is constructed so that a saw blade of either type can be placed therein either in a position occupying the plane of the frame or in a position in a plane at right angles to the plane of the frame.

In order to give an understanding of the invention I have illustrated in the drawing a selected embodiment thereof which will now be described after which the novel features will be pointed out in the appended claims.

In the drawing, Fig. 1 is a side view of a saw frame embodying my invention;

Fig. 2 is an enlarged sectional view on the line 2—2 Fig. 1 with parts broken out;

Fig. 3 is a fragmentary top plan view of the saw frame shown in Fig. 1;

Fig. 4 is a fragmentary perspective view of one arm of the frame;

Fig. 5 is an enlarged side view of the upper arm of the frame showing a saw blade made of fine gauge wire mounted in the frame;

Fig. 6 is a section on the line 6—6, Fig. 5.

The saw frame herein illustrated is indicated generally at 1 and it is made from a single piece of flat stock which is bent to provide the back 2 of the saw frame and the two blade-carrying arms 3, 4. The stock from which the frame is made is flat sided and has a general rectangular shape in cross section.

The saw blade 6 is carried by the ends of the arms 3 and 4 as usual in saw frames of this type and the lower arm 4 is provided with a handle 5 by which the saw is manipulated.

The saw frame is so made that when the saw is mounted in the ends of the arms 3 and 4 the resiliency of the frame holds the saw blade taut, this being a common construction of saw frames of this type.

One feature of the present invention relates to the manner in which the arms 3 and 4 are made to receive the saw blades. Each arm is formed at its end with a blade-receiving slot 7 in which the blade is received when it is to be mounted so as to occupy the same plane as that of the frame. These slots 7 are of sufficient depth to receive either a blade made of fine gauge wire such as the blade 8 in Figs. 5 and 6 and which is provided with the loop end 9, or a wider blade 6 of the type which has an anchoring pin 10 extending therethrough at each end. Each arm 3, 4 is formed on its outer edge with a transverse groove 11 adapted to receive the pin 10 when the pin-end blade 6 is used as shown in dotted lines Fig. 1, or to receive the lower portion of the loop 9 when the blade 8 of fine gauge wire and having a loop end is used.

It will be understood that when the blade is to be mounted in the frame it will be necessary to force the arms 3 and 2 together slightly so as to permit the pins 10 or the loops 9 to be seated in the grooves 11. When the pressure on the arms is released the resiliency of the arms will hold the blade taut as usual in saw frames of this type.

In order to provide a simple and inexpensive way of mounting the saw blade in the frame so that it will occupy a position at right angles to the plane of the frame as shown by full lines in Figs. 1 and 2, each arm 3, 4 is formed with a laterally-extending blade-receiving projection 12 which is preferably formed by swaging or offsetting a portion of the material of the arm. These laterally offset projections 12 can be formed by subjecting the ends of the arms 3 and 4 to the action of suitable dies which have a swaging or deforming effect on the arms, thereby to force some of the material at the back edge of the arm laterally into the shape of the projection 12. This projection may have different shapes and in the construction shown the projections are inclined laterally and outwardly and have the outer inclined face 13.

Each projection is provided with a blade-receiving slot 14 extending at right angles to the plane of the frame and of sufficient depth so that the bottom 15 of the slot registers with the side face 16 of the arm. Each projection 12 extends laterally from the arm 3 or 4 a sufficient extent so that when a wide saw blade 6 having the pins 10 at the ends is inserted in the slots 14, the ends of the projections will extend beyond the pins 10 and the outer face 13 of the projection will form a rest against which the pins have engagement.

While it is not essential that the outer faces 13 of the projections 12 should have the inclination shown in the drawing yet this construction has the advantage that the tension or strain on the saw blade tends to cause the pins to move down the inclined faces thereby causing the back edge 17 of the blade to hug the side 16 of the blade-carrying arm. These projections 12 are also equally adapted to provide a suitable mounting for the narrow blade 8 having the loop ends 9 for when such a blade is inserted in the slots 14 the loop ends have engagement with the rear face 13 of the projection 12 and thus the blade is securely retained in place.

A blade-supporting projection which is formed by swaging or offsetting a portion of the back edge of the arm can be made very inexpensively and when the saw frame is formed from a flat stock such as herein shown the projection can be made without weakening the saw frame. By means of this invention a saw frame which is adapted to support either a wide blade or a narrow blade and which is also adapted to support either type of blade in a position in which it occupies the plane of the frame as shown in Fig. 1 or a plane at right angles to the plane of the frame as shown in full lines in the drawing can be inexpensively manufactured.

As a further means of providing an inexpensive but practical saw frame I have provided a novel means of securing the handle to the frame.

The handle has a tang 18 welded thereto as shown at 19 and the wooden handle 5 is driven over the tang and thus secured thereto in usual manner. The welding of the tang to the frame can be accomplished inexpensively and it also produces a very rigid structure.

I claim:

1. A saw frame made of flat stock bent to form a back portion and two blade-carrying arms, each arm having struck up therefrom a blade-mounting projection which extends laterally of the arm, each projection having a blade-receiving slot extending at right angles to the arm, and a saw blade mounted in said slots.

2. A saw frame made of flat stock bent to form a back portion and two blade-carrying arms, each arm having struck up therefrom a blade-mounting projection which extends laterally of the arm, each projection having a blade-receiving slot extending at right angles to the arm, the outer surface of each projection inclining downwardly and inwardly from the end of the projection and a saw blade mounted in said slots and with the anchoring portions thereof engaging said inclined outer surfaces of the projections.

FREDERICK H. KELLEY.

CERTIFICATE OF CORRECTION.

Patent No. 1,972,740. September 4, 1934.

FREDERICK H. KELLEY.

It is hereby certified that the name of the assignee in the above numbered patent was erroneously described and specified as "G. W. Griffith Co." whereas said name should have been described and specified as G. W. Griffin Co, as shown by the records of assignments in this office; and that the said Letters Patent should be read with this correction therein that the same may conform to the record of the case in the Patent Office.

Signed and sealed this 2nd day of October, A. D. 1934.

Leslie Frazer (Seal)

Acting Commissioner of Patents.